July 17, 1928.  
J. O. NASLIN  
SERVER OF HOUSEHOLD ARTICLES  
Filed May 6, 1926  
1,677,404  
3 Sheets-Sheet 1

INVENTOR
John O. Naslin

July 17, 1928.
J. O. NASLIN
1,677,404
SERVER OF HOUSEHOLD ARTICLES
Filed May 6, 1926   3 Sheets-Sheet 2
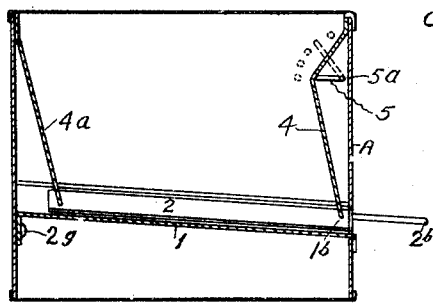
Fig. 10.
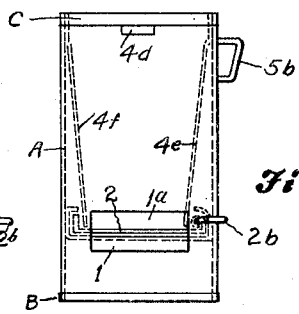
Fig. 11.
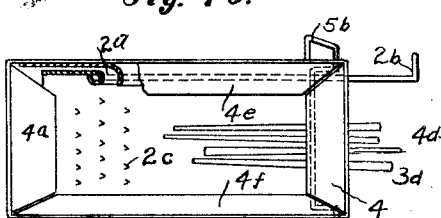
Fig. 12.
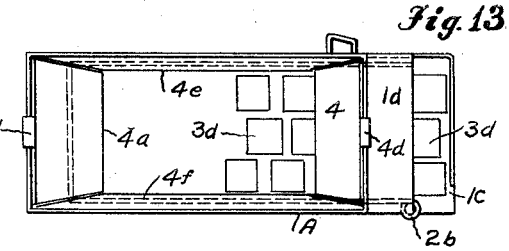
Fig. 13.
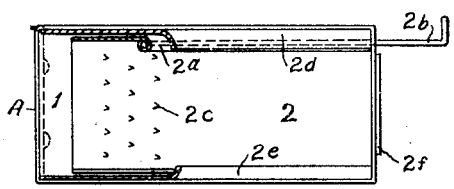
Fig. 14.
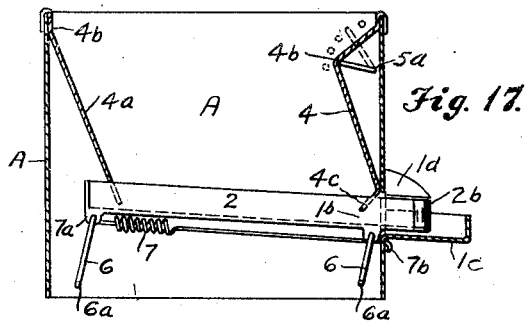
Fig. 17.
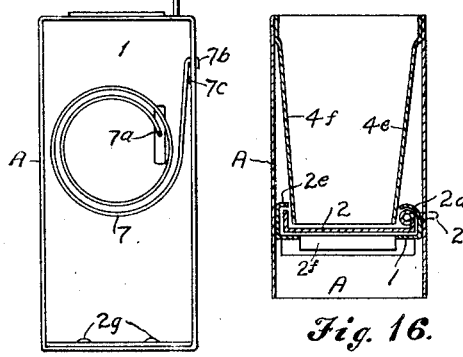
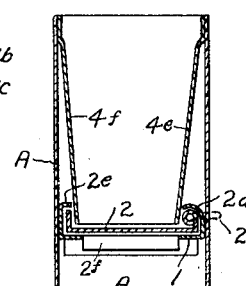
Fig. 15.
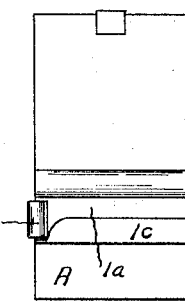
Fig. 16.
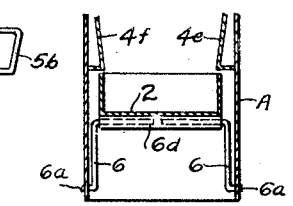
Fig. 18.
Fig. 19.
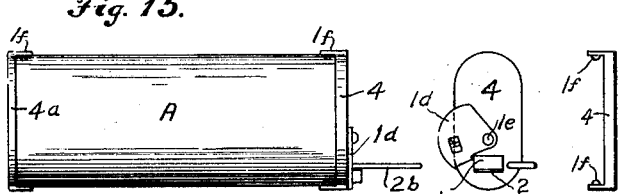
Fig. 20.
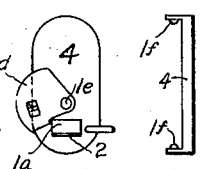
Fig. 21.
INVENTOR
John O. Naslin July 17, 1928.
J. O. NASLIN
SERVER OF HOUSEHOLD ARTICLES
Filed May 6, 1926
1,677,404
3 Sheets-Sheet 3
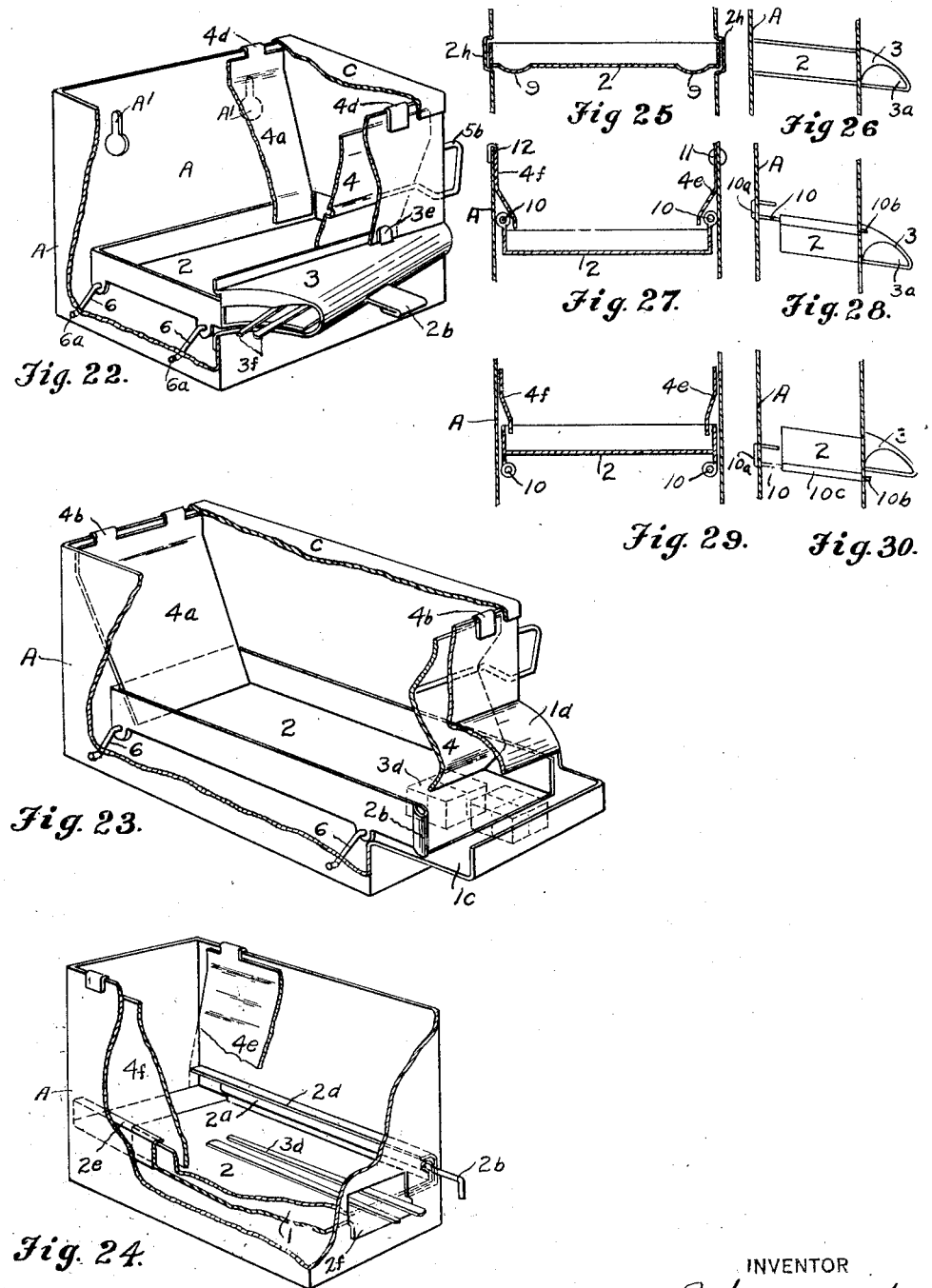
INVENTOR
John O. Naslin Patented July 17, 1928.

1,677,404

UNITED STATES PATENT OFFICE.

JOHN O. NASLIN, OF SEATTLE, WASHINGTON.

SERVER OF HOUSEHOLD ARTICLES.

Application filed May 6, 1926. Serial No. 107,202.

My invention relates to a server of household articles, such as tooth-picks, matches, sugar, coffee, cereals, peas, beans and the like, whereby such articles can be served in desired portions, without other means than by simple hand-operations; which may be more fully understood by the combinations of the different parts thereof hereinafter described and illustrated in the accompanying drawings, wherein—

Figure 1 is a front view of the device for serving tooth-picks and matches side-wise; Figure 2 is a top view thereof, with tooth-picks exposed in front; Figure 3 is a bottom view thereof, showing positions of supports and spring 7.

Figure 8:
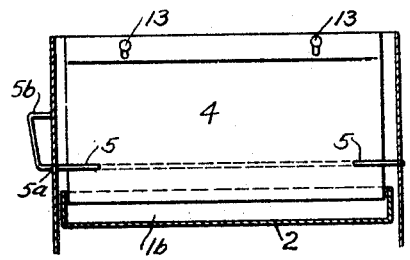
Figure 9:
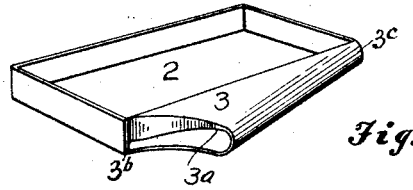

Figure 8 is a view of diaphragm 4 and crank-adjuster 5; Figure 9 is a view of bottom 2, as seen from the top, showing service-member 3 as an integral part thereof.

Figure 10 is a cross section of the device, as seen from the side, for serving tooth-picks and matches end-wise; Figure 11 is a front view, showing by dotted lines the positions of bottoms 1 and 2 and the diaphragms.

Figure 12 is a top view of the device showing tooth-picks exposed in front, and the pricked portion of bottom 2 in rear; Figure 13 is a top view of the device adapted for cube sugar; Figure 14 is another top view similar to Figure 12; Figure 15 is a bottom view, showing spring 7, and Figure 16 a front view thereof, showing the inner mechanisms of bottoms 1 and 2 and the diaphragms.

Figure 17 is a cross section as seen from the side of Figure 13; Figure 18 is a front view of the same, and Figure 19 a cross section, showing bottom 2, crank-supports and diaphragms.

Figures 20 and 21 are side and front views of the device adapted for pocket use.

Figure 22 is a perspective of the device, showing the positions of the mechanisms for serving tooth-picks and matches side-wise.

Figure 23 is another perspective showing mechanisms for serving cube-sugar; and Figure 24 another perspective thereof, adapted for serving tooth-picks and matches end-wise, showing tooth-picks and mechanisms exposed.

Figures 25 and 26 illustrate how bottom 2 may be supported in grooves or channels provided in the sides of case A; showing also grooves in said bottom, adapted for serving matches.

Figures 27 and 28 are front and side-views thereof, showing how said bottom may be supported by means of rods through tubes at upper edges of bottom 2, and Figures 29 and 30, show how said bottom may be supported by such rods and tubes at the bottom thereof.

Similar letters and numerals refer to similar parts throughout the several views.

My invention which is especially intended and adapted for kitchen and dining-room use, including lunch counters etc. consists of a case A, having a bottom B and top cover C, an outlet opening 1ª in one side or end near its lower part, and a stationary bottom member 1 and a vibrating bottom member 2, positioned on a plane with and in said opening, as hereinafter will be described.

The dimensions of the case and openings for such a device should be of the required measure in all directions, and otherwise adapted so that articles which are placed therein for removal through said opening will not be crowded or become jammed therein. Such a case is shown in Figures 1 to 5 and 10 to 12, which may be conveniently made about the size and dimension of some of the ordinary tooth-pick and match-boxes now in the market, which I consider practical for such use, for the reason, that such boxes can be opened at one end, placed in said case and tooth-picks and matches therein removed through said opening, without other means than by this device only, Such a device can be constructed in many various forms, adapted for different kinds of articles, or commodities, such as have been mentioned and others, which the applicant believes involve no other principles than that which may be included in this application for one patent.

The modifications of constructions, for instance, as shown in Figures 1 to 5, which are modes of constructions intended for serving tooth-picks and matches side-wise; in Figures 10 and 12 a mode of construction adapted for serving tooth-picks and matches end-wise; and the modes of constructions shown in Figures 13, 17 and 18, adapted for serving cube-sugar.

From this it can be clearly understood that there are no differences in the mechanical combinations of these modified forms, but merely a difference in the dimensions thereof; namely: In that for serving tooth-picks and matches side-wise, the case and bottom are longer from side to side, than from front to rear; while in that for serving sugar and tooth-picks and matches end-wise, the case and bottom are longer from front to rear, than from side to side. Hence, no other specific descriptions for each are needed, than as set forth in the original specification; which is as follows:

In its simplest form; if such a device, consisting only of a stationary bottom, and an outlet opening in the case, be of the right size and dimension adapted for the articles to be placed therein and served through such an opening, such articles can be removed through such an opening by merely tapping against the side or end of said case near such an opening.

Wherefore, if in any ordinary box containing tooth-picks or matches, such an opening is provided in one side or end, even with the bottom thereof, such articles can be removed from said box, one or more at a time through said opening, by merely tapping against the side or end of said box near said opening.

But such boxes, however, which are made of paper only, are not durable enough for such manipulations, wherefore, a more durable case is required for such a purpose.

But a case, even if made of suitable material, with an outlet opening and a stationary bottom as stated, will not fully serve the purpose either by such manipulations only. As from the foregoing it may be understood that the principles of this device are centered about the vibrating movements of its bottom members, and also to some extent about such movements of the case, it is most important that the whole of the device be constructed with those particular principles in view, so that the vibrating parts thereof be as light in weight as possible, and, of course, well suited for the purpose.

Wherefore, I have provided a device, consisting of a case A, that should be made of some suitable material, such as steel, metal or the like, not only with a stationary bottom member 1, but also a vibrating or sliding bottom member 2, as indicated in Figures 10 to 14, which is practical for such purposes as there indicated; but not absolutely necessary. At least for other purposes indicated in other figures on the drawings only sliding or vibrating bottom 2 is required which may be made in the shape of a tray, preferably with turned up edges on sides and rear, but plane on front side or end. That must, however, for all purposes be adapted and positioned in said case so that it can be easily moved back and forth therein and in said outlet opening so that articles can readily be moved out through said opening as may be required; and should have a downward slope from rear to front as may be desired for different purposes.

As already stated, my invention intended for serving tooth-picks and matches end-wise is illustrated in Figures 10 and 12, where it can be seen that vibrating bottom 2 is shorter than stationary bottom 1, on which it is adapted to slide back and forth in said case, so that articles will readily move through outlet opening $1^a$ by such movements. This outlet opening $1^a$, when articles are to be moved through it end-wise, need not be so long horizontally, as when articles are to be moved through it side-wise. Its dimension in that direction is, however, less particular than the dimension upward and downward, which should be exact for the purpose intended. The dimensions of bottom 1 being such that its upward and inward turned sides or edges snugly rest against the sides of case A from front to rear, and whereby grooves are formed in which bottom 2 is movably positioned; the latter's sides or edges being also turned upward, to one of which is firmly fixed tapper rod $2^b$, as at $2^a$ in Figures 12 and 14, whereby said bottom can be moved back and forth for the removal of articles through said opening. Further: Said bottom 1 is projecting through opening $1^a$ as shown at $2^c$, from which it has an upward slope to the back side of case A, where it has a downward turn tightly resting against the inside of the latter, in which dents are made from the outside to intersect with similar dents in said downward turn, whereby said bottom is held in a fixed position; as at $2^s$ in Figures 10 and 15. It may be further stated that the size of the vibrating bottom 2 must be as much shorter than case A, as the distance the former is to move backward and forward therein, as will be seen in the several figures.

Further, as to the different dimensions for different purposes, in a device adapted for serving tooth-picks and matches side-wise, the case and bottom should be longer from side to side, than from front to rear; and in a device adapted for serving tooth-picks and matches end-wise, including serving cube sugar, the case and bottom should be longer from front to rear than from side to side.

It will also be observed, that in the device for serving articles end-wise, no service member in front is required; while such is required for sugar and other articles that are to be served side-wise, such as tooth-picks, matches and the like. Such service members should conform to the purposes for which they are intended; for instance for cube-sugar, which I have provided and shown in Figures 13 and 17, in the form of a tray, attached to case A, below the outward extended end of bottom 2; that reaches beyond said end far enough outward to form a service tray for said cubes; where it is terminating in an upward bend, adapted to check said cubes in their forward movements. Over said opening at that point, I have attached to said case a projecting curved shield $1^d$, for shielding and protecting said cubes, which pass thereunder before reaching said tray. Such service members for serving tooth-picks and matches side-wise, which I have also provided, are shown in Figures 1 to 5, 9 and 22, where it is seen that said members consist of service folds, indicated by 3; which are formed by shaping a piece of sheet metal into a fold, that is considerably wider towards one end than at the other end at $3^c$. The wider end being cut from the outside fold in a diagonal curve towards end $3^b$, so that an opening is thereby formed in said fold, as shown at $3^a$ in said figures; and as articles are moved forward until they strike against the front of fold 3, they are projected through opening $3^a$, as indicated at $3^f$ in Figures 2 and 22.

Figure 1:
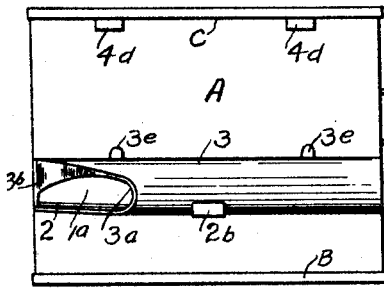

The inward extended edges of said fold reach through opening $1^a$ enough inside case A, to be in respective order bent upward and downward, so as to pinch against the upper and lower sides of said opening, so as not to slip outward, and is prevented from slipping inward by end-stops $3^b$ and $3^c$, and side-stops $3^e$ $3^e$, shown in Figures 1 and 22; thus resting against the side of said case and held in position so that it also can be removed and replaced, as may be required.

By having bottom 2 constructed with upward bent edges as shown on the drawings, articles are prevented from slipping over its sides and will more readily move forward through the outlet openings, than without such upward bent edges.

Figure 6:
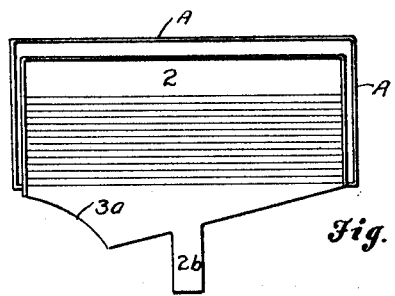
Figure 6 is a top view of bottom 2, showing grooves therein.
Figure 3:
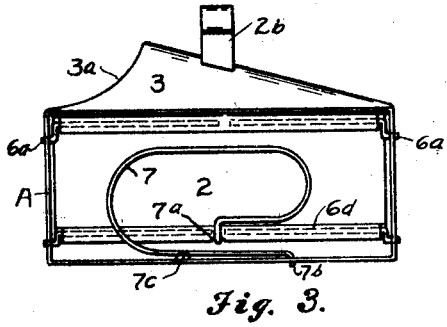
Figure 7:
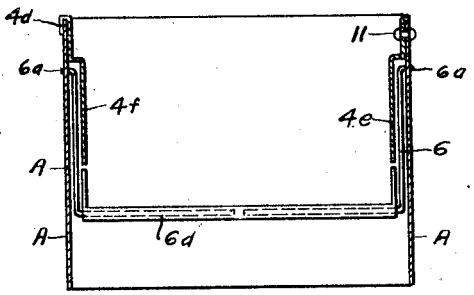
Figure 7 illustrates how bottom 2 may be supported by crank-suspenders in bearings from above instead of from below.

In devices for serving tooth-picks, and matches side-wise, and for serving sugar and other similar articles, said bottom should extend beyond the front side of case A about as far as said bottom can be moved backwards; but its outward movements should be limited to the upward turn of fold 3; see Figures 1 and 22. In Figure 9 is shown how said fold forms an integral part of said bottom. But when constructed a separate part, said bottom should have the shape and dimensions shown in Figure 6; and be provided with a "tapper", as shown at $2^b$ therein and other figures; and pricked and grooved as indicated at $2^c$ in Figures 6, 12 and 14. Wherein can be seen that "tapper" $2^b$ is formed by a square, round or oblong bend of the outward extended end of bottom 2; or it may be made in any other suitable manner or shape.

The means for supporting vibrating bottom 2, besides those which have already been described, and which I have provided, consist of crank-supports indicated by 6, of which there are four for each bottom, each being inserted at one end in bearings in the side of case A, as at $6^a$, where at about right angles, the crank-axles turn into shafts $6^d$, attached to said bottom; so that each independent of the other turns and swings, and form supports on which said bottom 2 can easily be moved back and forth as may be required; and as indicated in Figures 3, 4, 5, 17, 19, 22 and 23.

The other modes of supports for said bottom 2, which I have provided and shown in Figure 25, where the upward bent sides of said bottom are movably supported in grooves or channels in the sides of case A, as at $2^h$ in said figure; in Figures 27 and 28, where such supports consist of rods 10, inserted through case A at $10^a$, through shafts $10^c$ attached to the upper sides of bottom 2, and then through said case at $10^b$; and in Figures 29 and 30, where similar supports, as the last named, are positioned below said bottom; are shown for the purpose of noting, that there are various modes of supports that can be used for said bottom, but in which are involved no other principles, than what applicant believes can be included in and covered by his present patent.

While by the modes of supports already described, bottom 2 can very easily be moved back and forth with very little effort by the hand, such a mode of operation is, however, not the most practical, wherefore, I have provided means, consisting of a spring 7, connected to said bottom at $7^a$, and to said case at $7^b$ and $7^c$, suitably tensioned to automatically move said bottom outward, whenever it is moved inward; hence, by merely tapping against "tapper $2^b$", already described, articles are moved out through openings $1^a$ and $1^b$, as may be desired by such tappings only.

This spring can be of other shapes and bends than as shown, the exact shape being not so important, but its tension must be exact.

The grooves on bottom 2, as indicated at 9 9 in Figure 25, are provided for the extra room needed for matches, the dipped ends of which are considerably larger than the rest of the sticks, which, for that reason will lie and move outward on said bottom in better order than without such grooves. From the foregoing it can be understood that a device constructed in the manner so far described, would not be practical for all purposes; because articles and commodities for which this device is intended, are of so many different sizes and varieties, that could not properly be moved through one unchangeable opening only. Wherefore, I have provided means whereby one device can be used for serving more than one variety of articles or commodities; which means consists of a diaphragm 4, independent of and immediately inside of said opening $1^a$ in said case A;
with means of adjustments, whereby a changeable inner opening is formed, that vertically can be changed in size, as may be required and as indicated at $1^b$; see Figures 4, 5, 8, 10 and 17.
Said diaphragm consists of a sheet of metal, of the required shape and size, positioned inside said case, close to the inner front side thereof, against which it is held in place by means of laps, bent over the top-edges of said case, as at $4^b$ $4^b$, or may be fastened in any other suitable manner, from which it extends a short distance downward to $4^b$, where it has an outward projection adapted for a stop, as here below will be described.

From this point it again extends downward on a slant, inward or outward, as may be required and as shown on the drawings to its lower edge with an inward bend, as at $4^c$, which tends to prevent articles placed in said case from jamming against bottom 2 at that point; where said opening $1^b$ is formed, that can be changed as stated. For serving articles side-wise said opening should extend across the whole width of bottom 2, see Figure 8. But for serving articles end-wise, it can be, and in some cases, should be much shorter; see Figures 11, 21 and 24.

Figure 4:
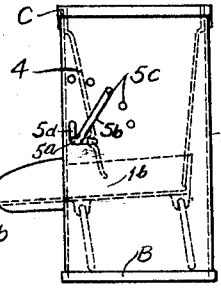
Figures 4 and 5 are side-views thereof, showing positions of bottom 2, the supports and diaphragms with adjusting means.
Figure 5:
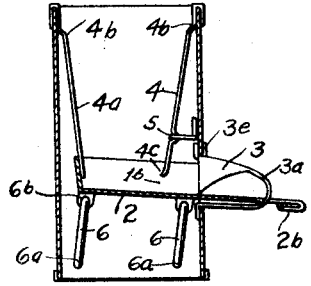
Figure 2:
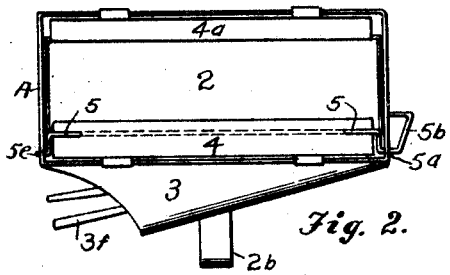

The means which I have provided for raising and lowering said diaphragm 4, or for vertically increasing and decreasing said opening $1^b$ by said diaphragm, consists of a crank-adjusting device, which can be inserted and positioned in said case through opening $5^d$, see Figure 4, so that it rests in bearing $5^a$ and $5^e$ in said case; see Figures 2 and 4. Where short crank-turns forms the intermediate portion, or the crank axle thereof; which is movably attached to said diaphragm, as at 5; see Figures 2, 4, 5, 8, 10, and 17; and is adapted with an adjustable handle $5^b$, the end of which presses against the side of said case, so that by moving said end from one to another in dents in said case at $5^c$, said opening $1^b$ can be vertically increased and decreased, as may be required.

I have also provided diaphragms for the other inner sides of said case A, which, except for being stationary, are somewhat similar to the one just described; and at the upper edges are held against the inner sides of said case by means of laps, rivets or the like, as at $4^d$ and 11 in the several figures; or in any other manner which may be suitable; with similar outward projections as described in the foregoing paragraph at $4^b$; and from said points extend downward or without such projections in manners, so as to limit and shape the room in said case, as may be required for articles placed therein for removal through said opening; so that such articles can readily and easily slide, or move down onto bottom 2 without jamming.

These diaphragms should not reach so far down as to press against said bottom, or in any other manner interfere with its back and forth movements. The projections of said diaphragms at $4^b$ $4^b$, are intended as stops for containers of articles, which may be placed in said case for removal; as such containers, when opened and placed therein, cannot move farther downward, than to said projection only.

What I claim is:

1. In a server of household articles, a case and an outlet opening therein, a bottom member adapted for vibrating movements in said case and opening, means swingingly supporting said bottom in said case for such movements, a diaphragm whereby over said bottom a changeable opening is formed in line with said outlet opening, means for raising and lowering said diaphragm, diaphragms for shaping and limiting the room in said case, a service member in front of said opening and means for moving said bottom back and forth.

2. In a server of household articles, a case and an outlet opening therein, a vibrating member movable in said case and opening, means whereby an inner changeable opening is formed inside said outlet opening, means for changing the room in said case, and means for controlling the movements of and for exposing articles in front of said opening.

3. In a server of household articles, a case and an outlet opening therein, a vibrating member operative in said case and opening, means whereby in line with and inside said opening a changeable outlet opening is formed, means for shaping and limiting the room in said case, vibrating means for said member and means for exposing articles in front thereof.
4. In a server of household articles, a case and an outlet opening therein, a vibrating member movable in said case and opening, supports for said member adapted for such movements, the moving means for said member, means whereby inside said opening an inner outlet opening is formed, the diaphragms, the service member in front of and the shield above said opening.

5. In a server of household articles, a case and an outlet opening therein, a vibrating member operative in said case and opening, a changeable outlet opening inside the former, the stationary diaphrams, and means whereby articles in said case are moved outward through said openings and projected for service in front thereof.

JOHN O. NASLIN.